United States Patent [19]
Rinecker

[11] B 3,991,689
[45] Nov. 16, 1976

[54] WASTE GREASE-BURNING SYSTEM

[75] Inventor: Ulf F. Rinecker, San Francisco, Calif.

[73] Assignee: Envirotech Corporation, Menlo Park, Calif.

[22] Filed: Apr. 11, 1975

[21] Appl. No.: 567,207

[44] Published under the second Trial Voluntary Protest Program on April 13, 1976 as document No. B 567,207.

Related U.S. Application Data

[62] Division of Ser. No. 352,139, April 18, 1973, Pat. No. 3,894,833.

[52] U.S. Cl. .............................. 110/8 P; 110/7 B; 431/117
[51] Int. Cl.² .......................................... F23G 5/02
[58] Field of Search ............. 110/8 R, 8 P, 7 B, 7 S; 431/117; 239/125

[56] References Cited
UNITED STATES PATENTS

| | | |
|---|---|---|
| 1,892,681 | 1/1933 | Rankin .............................. 110/8 P |
| 2,230,385 | 2/1941 | Pecker .............................. 110/8 P |
| 3,766,867 | 10/1973 | De Angelis ........................ 110/8 R |

*Primary Examiner*—Edward G. Favors
*Attorney, Agent, or Firm*—Robert E. Krebs; Thomas S. MacDonald

[57] ABSTRACT

Apparatus for incinerating grease-laden aqueous mixtures includes a burner assembly or having a swirl chamber whereinto the liquid is tangentially fed and swirled. From a nozzle connected to the chamber, a minor fraction of the feed mixture is emitted as a rotating, atomized spray for subsequent ignition. A major fraction of the feed is continuously recycled thereby maintaining a high liquid flow rate through the burner assembly. A system is described for conditioning feed mixtures, and particularly sewage water skimmings of the type derived from a primary sewage treatment operation prior to delivering them to the burner assembly; the system includes means for grinding, heating and settling the materials before incinerating them.

6 Claims, 3 Drawing Figures

WASTE GREASE-BURNING SYSTEM

This is a division of application Ser. No. 352,139 filed Apr. 18, 1973 and now U.S. Pat. No. 3,894,833.

BACKGROUND OF THE INVENTION

1. Field of the Invention

This invention generally relates to ways and means for the disposal by combustion of grease, scum, and other organic floatage such as are produced during waste water treatment processes; more particularly, this invention relates to ways and means for conditioning and burning mixtures of such materials which have a fairly high water content.

2. State of the Art

Municipal and industrial waste water treatment processes usually produce not only sedimentary wastes, such as sedementary sewage sludge, but also floating wastes which usually comprise, for example, grease, oil, scum and other materials which float to the water surface. Such floatage is particularly found in primary treatment tanks. Because such materials are capable of being removed from the water surface by a skimming process, they are hereinafter referred to as "skimmings." A blade, chain-driven scoop or other devices can be used to skim the water surface; sometimes a weir is used and the water and/or weir height controlled so the skimmings run off over the weir.

The skimmings comprise a large percentage of water (usually over 50%), together with the aforementioned grease, scum, wood chips and other floatage. Usually the skimmings comprise organic materials, but sometimes plastic pieces and synthetic filaments are also included. Such very non-homogeneous skimmings present difficult handling and disposal problems.

Known methods of disposal of the skimmings include burial, chemical digestion and burning. Equipment for burning the skimmings generally comprises a combustor or burner designed to handle a liquid waste through a steam, air, or mechanical atomizing nozzle. The liquid feed is atomized as finely as possible to present the greatest surface area for mixing with combustion air. Sometimes a secondary incineration chamber is provided and that may comprise, for example, a vertically-arranged cylinder which acts as its own stack.

It is also known to feed skimmings directly to sludge incinerators such as multiple-hearth furnaces, sometimes obviating the necessity of using auxiliary fuels to burn the solid sludge and at the same time disposing of the skimmings. However, due to their high thermal values, the skimmings must be fed slowly to the incinerator and then must be burned immediately or else there is the possibility of a subsequent uncontrollable flare-up. Such flare-ups can exceed the temperature capacity of the incinerator and, consequently, can destroy the furnace exhaust ducting and the like or even create an explosion.

Because the skimmings are not an evenly-flowing medium and often include large solid pieces or fibrous and synthetic strands, it is difficult to feed the skimmings to an incinerator while achieving therein an even distribution. To avoid clogging the supply system, the skimmings generally are introduced to the incinerator through a single large pipe. However, the flow from the single large pipe does not evenly distribute the skimming and, consequently, there is uneven burning inside the incinerator. As a result, ash stalactites sometimes form in the furnace and eventually interfere with its operation. Furthermore, grease may soak into the refractory brick of the furnace so that, after a period of time, the bricks are destroyed.

SUMMARY OF THE INVENTION

Ways and means are provided for disposing of floatage wastes or skimmings such as are accumulated, for example, as a by-product of waste-water treatment processes and which generally comprise nonhomogeneous aqueous liquid-solid mixtures. A burner assembly is provided for emitting a rotating, atomized spray of such a mixture for subsequent combustion, preferably in a multiple-hearth incinerator. The burner assembly includes a swirl chamber into which the skimmings are tangentially introduced to swirl therein and a nozzle is connected to the chamber for emitting a minor fraction, say 5 – 20%, of the incoming feed of skimmings as a rotating spray. A return line from the chamber is for recycling the remaining, major portion of the feed thereby to maintain a high liquid flow rate through the burner assembly to preclude clogging. A system is also provided for conditioning the skimmings prior to feeding them to the burner assembly. The system, in one embodiment, comprises a grinder which first receives the skimmings and means for decanting or settling the ground mixture thereby to obtain a relatively less aqueous overflow for delivery to the burner assembly.

OBJECTS OF THE INVENTION

A primary object of my invention is to provide ways and means for burning grease-laden aqueous mixtures containing some solids such as are obtained from primary sewage treatment operations;

Another object is to provide an apparatus for emitting a spray of such grease-laden mixtures for subsequent burning;

Yet another object is to provide a burner assembly for use in burning mixtures like those previously mentioned where the burner assembly includes means to return a substantial percentage of the total feed mixture flow so that the assembly can handle mixtures containing relatively large solid particles without clogging;

Still another object of my invention is to provide a system for conditioning a grease-water mixture such as is derived from a waste water treatment process, whereby such mixtures can be readily fed into an incinerator for burning.

BRIEF DESCRIPTION OF THE DRAWINGS

These and other objects and advantages of the invention may be readily ascertained from the following description and appended illustrations which are offered by way of example only and not in limitation of the invention, the scope of which is defined by the appended claims and equivalents and not by any preceding description. In the drawings:

DETAILED DESCRIPTION OF THE PREFERRED EMBODIMENT

Figure 1:
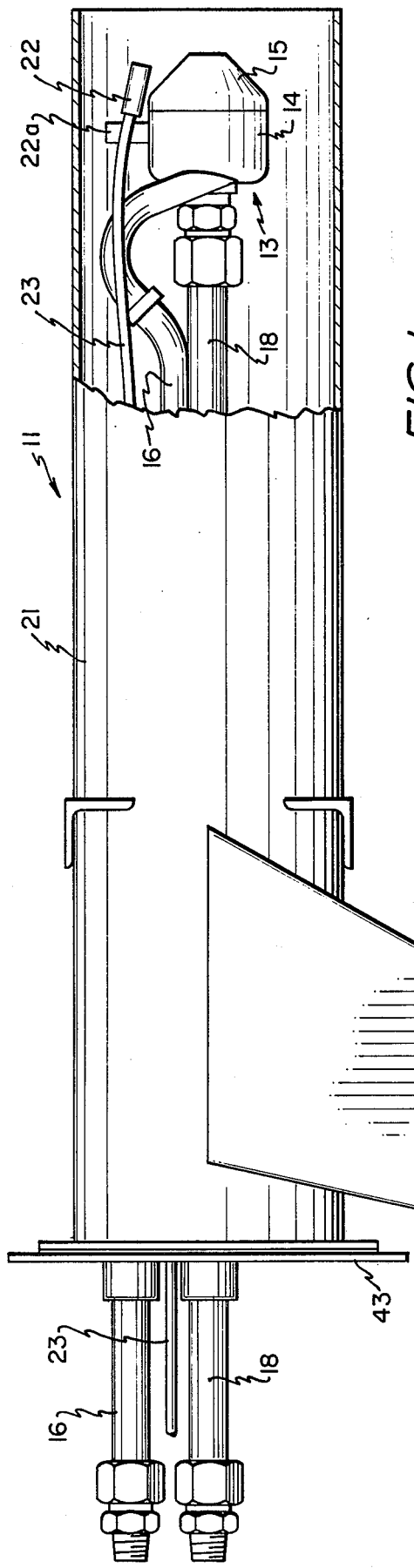
FIG. 1 is a side view, partially cut away, of a burner assembly according to the invention.

FIG. 1 illustrates a burner assembly 11 for burning feed mixtures such as are derived from sewage water skimmings. In the preferred embodiment of the invention, the skimmings will have previously been conditioned as will be hereinafter described in detail. The preferred feed material generally consists of a mixture of roughly 50% water and 50% grease which, preferably, has been conditioned as will be described hereinafter. The precise chemical makeup of the feed liquid varies, depending upon the origin of the waters from which the liquid wastes are derived and, even in a single plant, depending upon the time of day. The greases may, for example, include meat greases, industrial waste greases, various oils and pitches, and the like. Furthermore, the feed liquid often will contain various entrained solids; such solids may comprise wood chips, plastic pieces, fruit pits and the like. Rags and synthetic strings are usually present and have been a problem in prior grease incinerating systems because they may tangle and clog the system. Generally speaking, such feed materials usually have a thermal content of 60,000 – 80,000 BTU per gallon.

The burner assembly 11 generally includes a nozzle assembly generally designated 13 having a body or swirl chamber 14 whose one end is connected to a generally converging frustro-conical nozzle 15. A feed pipe 16 connects tangentially to the side of the chamber 14 for delivering the aforementioned mixtures into the chamber, and a return pipe 18 is connected to the rear of the chamber for returning a relatively large percentage, say up to 98%, of the feed from the chamber. The remaining fraction of the feed is sprayed outward from the nozzle. The nozzle assembly is fixed generally coaxially in a relatively large conduit 21 and is directed toward an open end thereof. In the illustrated embodiment, a plurality of spaced-apart radially extending struts 24 (only one of which can be seen in FIG. 1) are supportively connected at their one end to the inner wall of the conduit 21 and at their other end to the nozzle assembly 13. Air is carried through the conduit 21 to mix with the spray from the nozzle assembly, as will be described hereinafter.

Usually, a gas pilot 22 is fed by gas pipe 23 and is fixedly mounted next to the nozzle assembly 13 in position to ignite the material sprayed therefrom. Other means, however, can be provided to ignite the material, and the gas pilot is not necessary to the invention. Because the flame from the nozzle assembly sometimes exceeds eight feet in diameter and is at least that long, the pilot 22 can be positioned quite a distance (e.g., several feet) ahead of the nozzle assembly 13, rather than immediately next to it as shown.

Figure 2:
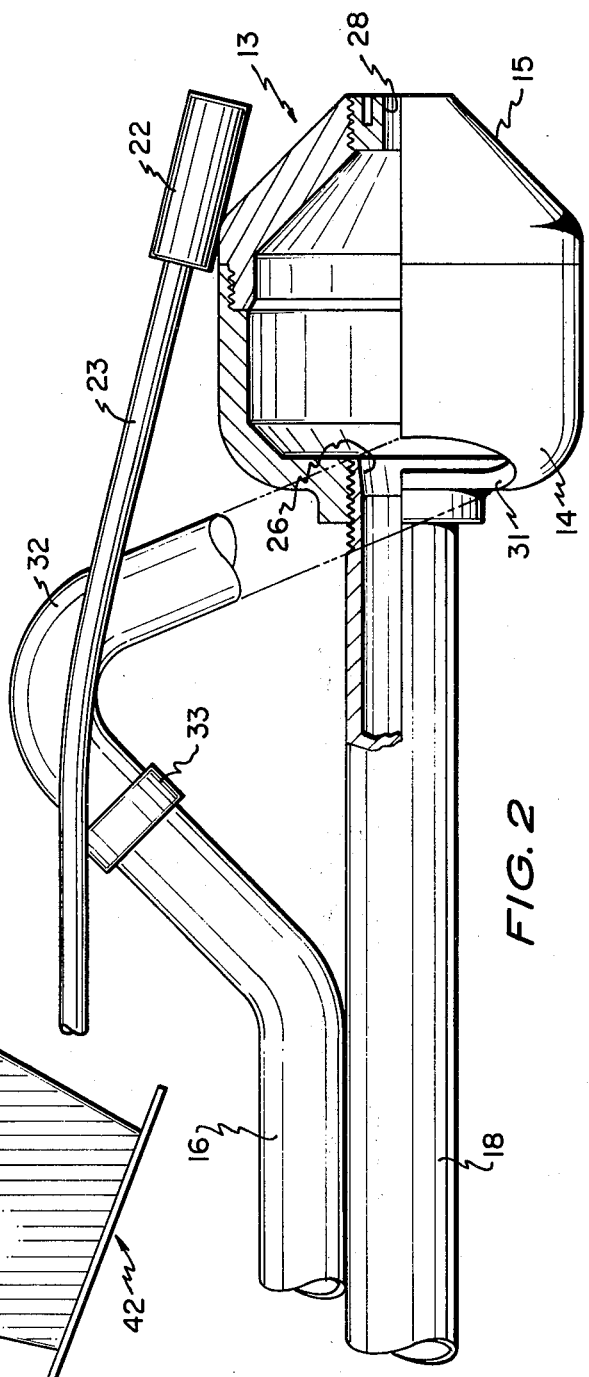
FIG. 2 is a side view, partially in section and enlarged for purposes of clarity, of a portion of the assembly of FIG. 1.

As is shown in detail in FIG. 2, the chamber 14 of the nozzle assembly 13 has a generally cylindrical hollow interior with an open forward end and a rearward closed end having an aperture 26 formed centrally therein. The aperture 26 is adapted for sealed connection to the return pipe 18. The sidewall of the chamber has a slanted opening 31 formed therein into which an adapter pipe 32 is sealingly fitted for connection to the feed pipe 16 as by fitting 33. Accordingly, the feed material is introduced generally tangentially into the cup and swirls therein in a direction which, in the drawings, is counter-clockwise. The larger end of the frustro-conical nozzle 15 is sealingly connected to the forward open end of the chamber. The nozzle converges outward at about a forty-five degree angle, from the chamber to a smaller axial opening 28 from which the material is emitted. In practice, it has been determined that the minimum diameter of the axial opening 28 is about one-half inch; with such a diameter, the nozzle can readily pass solid pieces which are entrained in the feed mixture.

The swirling or vortex-like action of the liquid feed in the swirl chamber 14 is quite important since the entering feed is thereby broken up or torn into discrete droplets which are then more readily and thoroughly burnable. Also, the swirling motion tends to keep the nozzle clear from clogging because the agitation tends to dislodge any particles which might otherwise lodge therein. Since the frustro-conical tip is smoothly tapered and the axial opening is large, the feed material continues to swirl as it sprays from the nozzle. In other words, the spray which leaves the nozzle also rotates in a counter-clockwise sense.

In the illustrated embodiment, a straight tubular piece 29 is threaded into the forward end of the nozzle 15 and actually defines the opening 28. The tubular piece allows ready replacement of this portion of the nozzle and allows selection of the size of opening 28 by using tubes having various inside diameters. Furthermore, in practice, it has been found that this straight section at the very end of the nozzle creates better flame characteristics.

As was previously mentioned, only a minor fraction of the feed material leaves the nozzle as a spray at any given time. The major portion of the feed is returned, or recycled, from the nozzle assembly via the pipe 18. In other words, the quantity of circulation through the nozzle substantially exceeds the quantity of material which is sprayed from the nozzle. Preferably, the spray comprises a maximum of 10% of the circulating flow. Thus, preferably 90–95% of the flow is recirculated. The excess circulation is provided so that relatively high flow rates may be achieved in the system as a whole and so that relatively larger piping can be used; accordingly, the system operates without clogging even when occasional large solid pieces are entrained in the feed mixture.

The spray from the nozzle is burned in the presence of air which is supplied through the conduit 21. Preferably, the air flowing through the conduit has a rotational component opposite to the rotation of the nozzle spray. This can be accomplished, as shown in FIG. 1, by introducing air from a blower, or the like, into an inlet duct 42 which generally tangentially converges with the conduit 21; thus the air flow through the conduit 21 will rotate clockwise. The conduit 21 is closed behind the inlet duct 42 by a closure number 43 which may include appropriately-spaced apertures through which the inlet pipe 16, the return pipe 18, and the gas pilot pipe 23 extend and are supported.

Preferably, the open end of the conduit 21 is connected directly into a multiple hearth incinerator so that the actual combustion occurs within one of the hearths thereof. Said incinerators are, of course, well known. Since the spray evenly distributes the skimmings for burning across the hearth of the incinerator, the previously mentioned problems of uneven burning and ash stalactite formation are resolved. Furthermore, the heat from the burning skimmings can be used to dry and/or burn sludge in the incinerator, thereby eliminating the use of auxiliary fuel such as natural gas. The multiple-hearth incinerator, in turn, acts as a stack and combustion chamber for the burner assembly.

Figure 3:
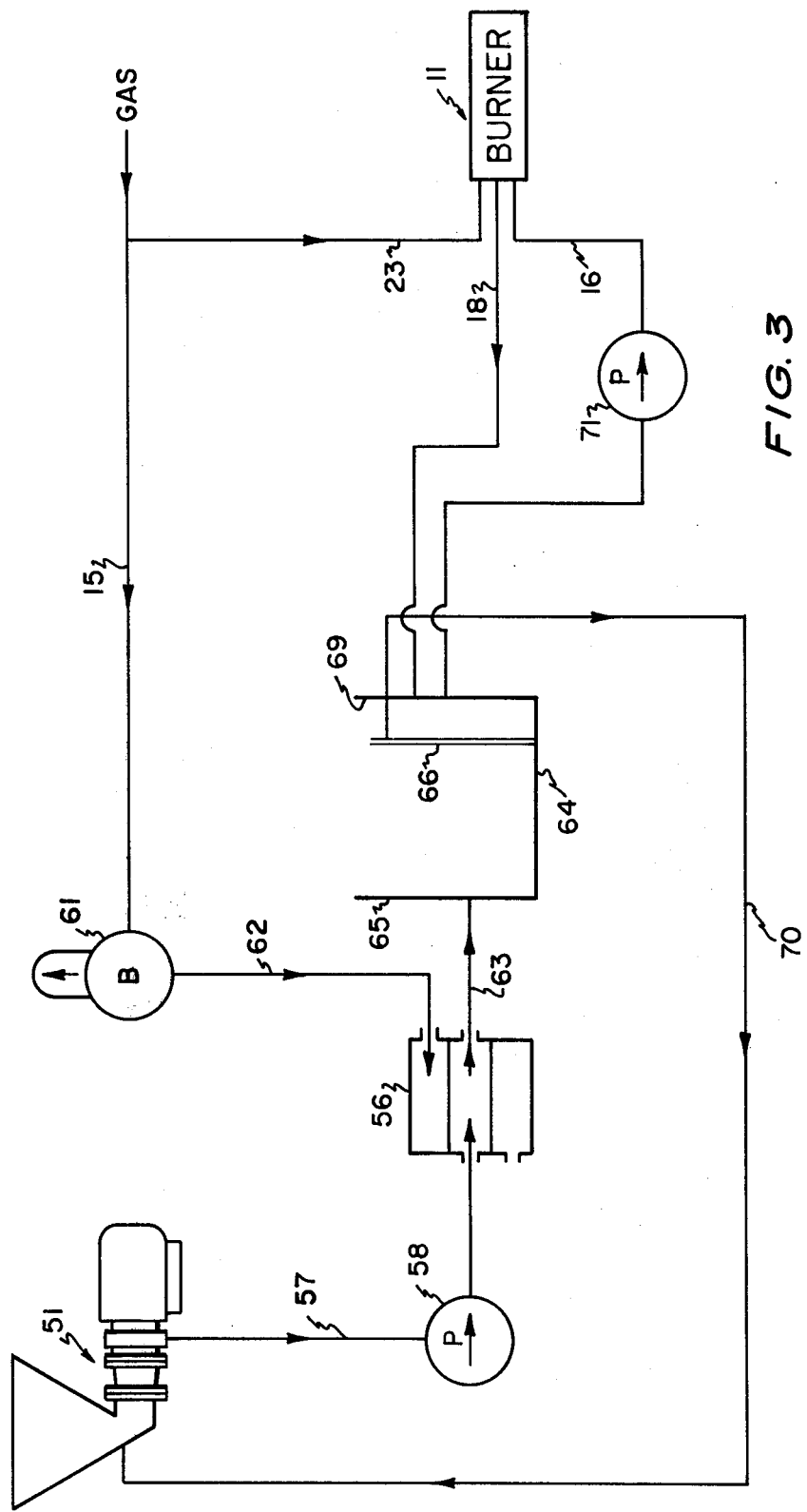
FIG. 3 is a generally schematic diagram of a system for use in conjunction with the burner assembly of FIG. 1.

FIG. 3 shows one embodiment of a system for conditioning the previously-defined skimmings and then incinerating them by means of the burner assembly 11. Skimmings, directly derived from a waste-water treatment process, generally comprise 80–90% water and only 10% grease or other organic materials. As such, the skimmings are difficult or impossible to burn because their low calorific value will not reasonably support combustion. According to the system of FIG. 3, the skimmings are first fed to a grinder 51. Such a grinder is a commercially-available component which functions generally like a home garbage disposal unit. The grinder coarsely grinds or commutates the skimmings so that the solid particles therein are usually no greater than one-half inch in diameter. Some mixing is also accomplished in the grinder and the resulting coarsely-ground mixture may be characterized as a coarse dispersion. That dispersion is then passed, via a pipe 57, into a heat exchanger 56 which can be any one of the various well-known types. In the heat exchanger, the mixture is subject to heat transferring contact with a medium such as steam or other hot fluid which elevates the temperature of the mixture to the preferred range of about 180°–200°F. In the illustrated system, the hot fluid is generated in a boiler 61 and fed, via pipe 62, to the heat exchanger; however, other means may be used to raise the temperature of the mixture.

Heating of the mixture accomplishes several results. If the mixture is very thick or stiff, it will flow much more readily after heating. If the mixture contains many relatively large pieces of animal fat, heating will either break down the pieces and thereby create a more homogenous dispersion, or the heating will allow water to enter the cells of the fat thereby creating a more readily burned material.

The heated mixture flows from the heat exchanger via line 63 to a partitioned holding tank 64 for decanting in a first compartment 65 thereof. It should be understood that the influent to the tank 64 is relatively highly aqueous (e.g., about 80–90% water) and that the grease and particles of animal fat therein have a limited capacity for absorbing or entrapping water, even after heating. Consequently, the influent contains a substantial excess of water which is partially separable from the other materials by decanting in the tank 64. The heavy solids in the influent mixture settle to the bottom of the compartment. Concomitantly, lighter liquids, such as oil and greases, and some solids rise to the water surface to thereby accomplish a phase separation. The materials which rise to the water surface flow over a weir 66 which partitions the first compartment from a second compartment 69. The overflow into compartment 69 comprises the feed to the burner assembly and, as previously mentioned, roughly consists of 50% water, 50% grease and oil, and some solid floatage. Conventional means, not shown, can be utilized to maintain the water surface height generally constant in the compartment 65. The water and settled solids remaining in the first compartment 65 can be drained therefrom as an overflow through a drainage outlet 68 for subsequent disposal outside of the system. It has been found that a relatively small percentage of the materials, such as rags and fibers, which enter the first compartment of the decanting tank neither really float nor sink; in the illustrated system, such materials are periodically withdrawn through line 70 and returned for further grinding in the grinder 51.

From the compartment 69, the oil-water mixture is pumped, as by means of a conventional metering pump 71, into the previously-described burner assembly 11 via the inlet pipe 16. The flow that returns from the burner assembly 11 via the pipe 18 re-enters the second compartment 69 of the decant tank 64 and is thereafter recycled through the burner. This multiple recycling of the conditioned mixture produces a finer, more homogeneous feed mixture to the burner. Under some circumstances the return flow from the burner assembly can be returned to locations in the system other than the decant tank 64; for example, where heating is particularly important, the flow could be returned to the heat exchanger 56.

It should be clearly understood that the previously-described system of FIG. 3 is by way of example only and that many variations thereon, while still within the spirit of the invention, will readily suggest themselves to a person skilled in the art of the invention. For example, the effluent mixture from the grinder 51 may be first decanted in tank 64 and then heated. Where the decanted effluent contains only a small percentage of water, (e.g., less than 30% water), heating may be accomplished by directly mixing heated water with the effluent rather than by using a heat exchanger. The heated water can be obtained, for example, from a boiler or from a wet scrubber which is used to clean particulate matter from the incinerator off gases. Also, the burner assembly can be used to burn industrial waste greases and the like rather than the previously mentioned sewage water skimmings.

I claim:

1. A system for conditioning and burning materials such as aqueous mixtures containing organic solids that constitute skimmed floatage from waste-water treatment operations, comprising:
   a. Grinder means for first receiving and grinding such materials;
   b. A settling device for receiving the ground materials and permitting the same to settle; said settling means including a settling zone, means for receiving a decanted overflow from the settling zone, and a zone for containing said overflow;
   c. A burner assembly which receives a flow of material from said overflow containing zone and emits a fraction thereof as a spray which is subsequently burned, said burner assembly including return means for returning a fraction of the flow for subsequent recycling.

2. A system according to claim 1 including heating means for heating the flow of ground material to a temperature ranging from about 135° to 210°F.

3. A system according to claim 1 wherein said return flow is returned to said over-flow containing zone.

4. A system according to claim 1 wherein said burner assembly comprises:
   a. A nozzle assembly which includes a swirl chamber and a nozzle which tapers outwardly and convergingly from said chamber to an outlet end having a single opening therein of sufficient size to allow passage of solid particles therethrough;
   b. Means in flow communication with the interior of said swirl chamber for delivering a feed of a liquid-solid mixture thereinto in a generally tangential direction whereby said entering feed swirls about in said chamber;

c. Means in flow communication with the interior of said chamber for returning a fraction of said feed from said swirl chamber to said settling device, the remaining fraction of said feed being sprayed from said nozzle;

d. Conduit means spacedly surrounding said nozzle assembly and having an open end surrounding said nozzle;

e. Inlet means in communication with said conduit means for delivering a flow of oxygen-bearing gas thereinto to flow out said open end of said conduit to mix with the spray from said nozzle and to provide an oxidizing medium therefor.

5. An apparatus according to claim 4 wherein said inlet means for said conduit means includes means tangentially connected thereto to introduce the gas in a flow which has a rotational component opposite to the rotation of the feed mixture in said chamber.

6. A system according to claim 1 wherein said burner assembly is connected in flow communication with an incinerator whereby the spray from said burner assembly is ignited and burned inside said incinerator.

* * * * *